US010737772B2

(12) United States Patent
Langenbacher et al.

(10) Patent No.: US 10,737,772 B2
(45) Date of Patent: Aug. 11, 2020

(54) METHOD OF PREVENTING SEPARATION OF A FLUID FLOW AND FLOW BODY SYSTEM

(71) Applicant: Airbus Defence and Space GmbH, Taufkirchen (DE)

(72) Inventors: Peter Langenbacher, Munich (DE); Stefan Storm, Unterschleissheim (DE); Michael Meyer, Munich (DE)

(73) Assignee: Airbus Defence and Space GmbH, Taufkirchen (DE)

(*) Notice: Subject to any disclaimer, the term of this patent is extended or adjusted under 35 U.S.C. 154(b) by 226 days.

(21) Appl. No.: 15/840,546

(22) Filed: Dec. 13, 2017

(65) Prior Publication Data
US 2018/0162521 A1 Jun. 14, 2018

(30) Foreign Application Priority Data
Dec. 14, 2016 (DE) .................. 10 2016 224 889

(51) Int. Cl.
*B64C 23/06* (2006.01)
*F15D 1/12* (2006.01)
*F15D 1/00* (2006.01)
*B64C 21/04* (2006.01)

(52) U.S. Cl.
CPC .............. *B64C 23/06* (2013.01); *B64C 21/04* (2013.01); *F15D 1/004* (2013.01); *F15D 1/008* (2013.01); *F15D 1/12* (2013.01); *Y02T 50/162* (2013.01)

(58) Field of Classification Search
CPC ....... B64C 23/06; B64C 21/08; B64C 21/025; B64C 21/04; B64C 21/00; B64C 2230/04; B64C 2230/06; B64C 2230/18; B64C 2230/20
See application file for complete search history.

(56) References Cited

U.S. PATENT DOCUMENTS

| 3,578,264 | A | 5/1971 | Kuethe |
| 8,382,043 | B1* | 2/2013 | Raghu .................. B64C 21/04 244/1 N |
| 2006/0273197 | A1* | 12/2006 | Saddoughi .............. B05B 1/08 239/265.17 |
| 2012/0256056 | A1* | 10/2012 | Seifert .................. B64C 21/025 244/204.1 |
| 2015/0204306 | A1* | 7/2015 | Herr ....................... F03D 7/022 416/23 |
| 2016/0318602 | A1* | 11/2016 | Whalen .................... B64C 9/14 |
| 2017/0370387 | A1* | 12/2017 | Nino ........................ F15D 1/12 |

FOREIGN PATENT DOCUMENTS

| DE | 19815519 A1 | 10/1999 |
| EP | 1710156 A2 | 10/2006 |
| EP | 2889217 A1 | 7/2015 |
| GB | 2522780 A | 8/2015 |

OTHER PUBLICATIONS

British Search Report for Great Britain Application No. 1720760.6 dated Jun. 13, 2018.

* cited by examiner

*Primary Examiner* — Richard G Davis
(74) *Attorney, Agent, or Firm* — Jenkins, Wilson, Taylor & Hunt, P.A.

(57) ABSTRACT

A method of preventing separation of a fluid flow flowing over a flow surface is described. The method includes generating longitudinal vortices for suppressing or delaying separation of the flow, and enhancing the longitudinal vortices. A flow body system having a flow body and a flow control arrangement is further described.

23 Claims, 3 Drawing Sheets

METHOD OF PREVENTING SEPARATION OF A FLUID FLOW AND FLOW BODY SYSTEM

CROSS-REFERENCE TO RELATED APPLICATION

This application claims priority to German Patent Application DE 10 2016 224 889.8 filed Dec. 14, 2016, the entire disclosure of which is incorporated by reference herein.

TECHNICAL FIELD

The present disclosure relates to a method of preventing separation of a fluid flow, and to a flow body system.

Although surfaces over which a fluid flows can be used in many different applications, the present disclosure and the problem underlying it are explained in greater detail in relation to surfaces of aircraft over which a fluid flows.

BACKGROUND

In order to control the separation of fluid flows at surfaces over which a fluid flows, in particular at bodies around which a fluid flows, such as at aerofoils of aircraft, compressed air is frequently blown out in a pulsed manner onto the flow surface of the body around which a fluid flows. This serves to energise the boundary layer with the aim of preventing separation of the flow and achieving an advantageous pressure distribution along the surface with improved lift and a reduced level of flow drag of the flow body.

EP 1 710 156 B1 describes a flow control system which is designed to reduce or suppress the development of zones of separated fluid flows in the region of an engine outlet.

SUMMARY

It is an idea of the present disclosure to provide a method and a flow body system with which the separation of a fluid flow can reliably be prevented.

According to a first aspect of the disclosure herein, a method of preventing separation of a fluid flow flowing in a flow direction over a flow surface is provided. Longitudinal vortices for suppressing or delaying the separation of the flow from the flow surface are thereby generated by one or more first flow actuators associated with the flow surface. In a further method step, the longitudinal vortices are enhanced by one or more second flow actuators associated with the flow surface, which second flow actuators are arranged downstream of the first flow actuator in the flow direction.

Accordingly, longitudinal vortices are first generated at one or more first locations on the flow surface by flow actuators. Compared to transverse vortices, longitudinal vortices are transported over a significantly longer distance in the flow direction, or longitudinal vortices decay significantly more slowly than transverse vortices. Longitudinal vortices are thus able to introduce energy into the boundary layer of the fluid flow over a relatively large region of the flow surface along the flow direction and thus prevent separation of the flow. According to the disclosure herein, in a further method step, the longitudinal vortices are enhanced downstream, relative to the flow direction, of the one or more first locations. Enhancement is understood as being in particular an increase in the vorticity of the longitudinal vortex. This can include in particular increasing the rotational speed of the longitudinal vortex and/or reducing the cross-sectional area of the vortex. The longitudinal vortices are accordingly stabilized along the flow direction and the decay thereof is thus prevented. In this manner, the longitudinal vortex counteracts flow separation over a considerable length along the flow direction due to the energy input into the boundary layer.

The flow surface can in particular be provided on a flow body over or around which a fluid flows, such as, for example, an outer skin of a vehicle or of an aerodynamic body generally, or on a body through which a fluid flows, such as a pipe, a channel or the like.

The first flow actuators can be arranged in particular to form a first actuator row. The first flow actuators are thereby arranged spaced apart from one another in a transverse direction extending transversely to the flow direction. Furthermore, the second flow actuators can also be arranged to form one or more second actuator rows. For example, a first actuator row and in addition one, two, three, four or more second actuator rows can be provided. The at least one second actuator row is arranged spaced apart from the first actuator row in the flow direction. Within the second actuator row, the second flow actuators are spaced apart from one another in the transverse direction. Within the first and second actuator rows, the first and second flow actuators can be arranged in alignment, for example, so that they form a straight row. Alternatively, it can be provided that the first flow actuators and the second flow actuators of the first and second actuator rows are also arranged spaced apart from one another or offset in the flow direction, so that a curve-like arrangement of the first and second actuator rows is obtained. In general, it can be provided that the first and second actuator rows extend along one another, in particular parallel to one another. The first actuator row may extend along a front edge of the flow body.

The first and/or second flow actuators are spaced apart from one another in the transverse direction within the first and second actuator rows in each case by a predetermined distance, for example between 10 mm and 300 mm. In this range of distances, mutual stabilization of the longitudinal vortices is achieved for a large range of marginal flow conditions, such as the flow speed.

According to one embodiment of the method, at least one of the one or more first flow actuators for generating the longitudinal vortices is in the form of a raised element protruding from the flow surface. In particular, all of the one or more first flow actuators, for example within the first actuator row, can be in the form of raised elements. A structurally simple solution for reliably generating the longitudinal vortices is thereby provided.

In general it can be provided that the raised element has a flow-deflecting surface which protrudes from the flow surface and extends obliquely or transversely to the flow direction as well as obliquely or to the transverse direction. Flow plates, for example, are suitable as raised elements for this purpose. It can also be provided that the raised element has a ramp-like, block-like or similar form.

It can further be provided that the raised element is movable relative to the flow surface, in particular is movable out of and into the flow surface. Infinite adjustability can here be provided in particular. It is also possible to provide purely binary adjustability between a working position, in which the respective raised element protrudes from the flow surface, and a retracted position, in which the respective raised element is flush with the flow surface. Such a binary adjustment can be realised with a fold-out mechanism, for example, in which the raised elements can be folded out from the flow surface by a positioning device, such as, for example, a spring.

A raised element on the flow surface can also be formed by a geometry change, that is to say a reversible deformation of the flow surface. In this manner, the properties of the longitudinal vortex that is generated are flexibly adjustable and in particular can be adapted to the marginal flow conditions. The raised element can accordingly form an active flow actuator or, as described above, a passive flow actuator.

According to a further embodiment of the method, it is provided that the longitudinal vortices are generated by blowing a blow-out fluid or pressurized fluid out of a blow-out opening, formed in the flow surface, of at least one of the one or more first actuators. There can accordingly be provided, for example, a first actuator row within which both first flow actuators in the form of raised elements and first flow actuators having blow-out openings are provided. In particular, it can also be provided that all the first flow actuators of the first actuator row have blow-out openings. In this case, the first flow actuators of the first actuator row are in the form of active flow actuators. In particular, a fluid feed device can be provided which is configured to feed a blow-out fluid to the blow-out openings of the first actuator row, which are arranged to form a row oriented along the transverse direction. The fluid can be blown out in a temporally continuous or pulsed manner. Generating the longitudinal vortices by blowing out has the advantage that the longitudinal vortices can advantageously be adapted to the marginal flow conditions by changing the blow-out conditions, that is to say, for example, the mass flow rate, the pulse rate with which the blow-out fluid is blown out, or the flow direction of the blow-out fluid.

A first flow actuator can in particular be in the form of a fluidic oscillator. A flow actuator thereby forms at least one blow-out opening on the flow surface. A channel system is connected thereto, which channel system is designed to generate a self-excited oscillation in the flow of the blow-out fluid. It is thus possible to achieve pulsed blowing out and accordingly efficient excitation of longitudinal vortices without moving parts. At the same time, as a result of the blow-out openings, no parasitic flow drag at the flow surface is generated.

It can further be provided that the blow-out opening in the case of at least one of the one or more first actuators is formed by a slot extending obliquely to the flow direction. The blow-out fluid is hereby blown out of an elongate slot which has a longitudinal extent extending obliquely or at an angle to the flow direction. With such a configuration, a shear layer between the blow-out fluid and the fluid flow flowing around the flow surface is generated in an effective manner, which leads to the formation of the longitudinal vortices.

Alternatively, the blow-out opening in the case of at least one of the one or more first actuators can be in the form of a bore through which the blow-out fluid is blown out with a directional component perpendicular to the flow direction of the fluid flow. Accordingly, the blow-out fluid is blown out of a circular blow-out opening. The blow-out opening forms the end of bores formed in the flow body. The bore has a longitudinal axis which runs obliquely to a normal direction. The normal direction is perpendicular to a tangent to the flow surface in the region of the opening and thus runs transversely to the flow direction and transversely to the transverse direction. The longitudinal axis of the bore further runs obliquely or transversely to the flow direction. In other words, the longitudinal axis is rotated about an axis running in the transverse direction and about an axis running in the flow direction. This means that the blow-out fluid is blown out in a blow-out direction which is defined by the longitudinal axis and which has a directional component perpendicular to the flow direction of the fluid flow. The directional component of the blow-out fluid that is perpendicular to the flow direction of the fluid flow efficiently effects turning of the fluid flow and thus advantageously effects the formation of longitudinal vortices.

In general, therefore, the longitudinal vortices can be generated by a single first flow actuator or by a plurality of first flow actuators. In both cases, the first flow actuator can be in the form of a movable or fixed raised element protruding from the flow surface, or the first flow actuator can have a blow-out opening for blowing out blow-out fluid for generating the longitudinal vortices. Where a plurality of first flow actuators are provided, they can all be in the form of movable or fixed raised elements protruding from the flow surface, or all the first flow actuators can have a blow-out opening for blowing out blow-out fluid for generating the longitudinal vortices. Alternatively, some of the first flow actuators can be in the form of movable or fixed raised elements protruding from the flow surface, and some of the first flow actuators can have a blow-out opening for blowing out blow-out fluid for generating the longitudinal vortices. Where a plurality of first flow actuators are provided, it is further possible to provide in each case both bores and slots, or both fixed and movable raised elements.

According to one embodiment of the method, at least one of the one or more second flow actuators for enhancing the longitudinal vortices is in the form of a raised element protruding from the flow surface. In particular, all of the one or more first actuators, for example within the first actuator row, can be in the form of raised elements. A structurally simple solution for reliably enhancing the longitudinal vortices is thereby provided. The raised elements serve to deflect the fluid flow, so that it is accelerated locally. As a result, there is an additional energy input into the flow and thus the longitudinal vortex is enhanced or intensified, which leads to stabilization thereof.

In general it can be provided that the raised element of a particular second flow actuator has a flow-deflecting surface which protrudes from the flow surface and extends obliquely or transversely to the flow direction as well as obliquely or to the transverse direction. Flow plates, for example, are suitable as raised elements for this purpose. It can also be provided that the raised element has a ramp-like, block-like or similar form. It can further be provided that the raised element is movable relative to the flow surface, in particular is movable out of and into the flow surface. A particular raised element can also be formed by a geometry change, that is to say a reversible deformation of the flow surface.

In general, a height with which the raised element protrudes from the flow surface can be adjusted. In this manner, the energy input into the flow is flexibly adjustable and the enhancement can in particular be adapted to the marginal flow conditions. The raised element can accordingly form an active flow actuator or, as described above, a passive flow actuator.

According to a further embodiment of the method, it is provided that the longitudinal vortices are enhanced by blowing blow-out fluid out of blow-out openings, formed in the flow surface, of one or more of the second actuators. Accordingly, a blow-out or pressurized fluid is thus blown out of blow-out openings of the flow surface downstream of the one or more first flow actuators. As a result, there is an additional energy input into the flow, and in particular into the longitudinal vortex. The longitudinal vortex is thereby enhanced or intensified. This can include in particular increasing the vorticity and/or reducing the cross-sectional area thereof.

At least one of the blow-out openings of the one or more second actuators can be in the form of a slot or bore. In particular, this slot can be in the form of a slot extending obliquely to the flow direction. For example, the particular blow-out opening of the particular second actuator can be formed in the same or a similar manner as described for a blow-out opening of the first actuator. In particular, the blow-out fluid may be blown out of the blow-out openings of the second actuator along a rotational direction of the longitudinal vortices, that is to say substantially tangentially to the longitudinal vortex. The longitudinal vortex is accordingly purposively and efficiently enhanced, whereby the longitudinal vortex delivers a large energy input into the boundary layer over a long distance along the flow direction.

In general, the longitudinal vortices can thus be enhanced by a single second flow actuator or by a plurality of second flow actuators. In both cases, the second flow actuator can be in the form of a movable or fixed raised element protruding from the flow surface, or the second flow actuator can have a blow-out opening for blowing out blow-out fluid for enhancing the longitudinal vortices. Where a plurality of second flow actuators are provided, they can all be in the form of movable or fixed raised elements protruding from the flow surface, or all the second flow actuators can have a blow-out opening for blowing out blow-out fluid for enhancing the longitudinal vortices. Alternatively, some of the second flow actuators can be in the form of movable or fixed raised elements protruding from the flow surface, and some of the second flow actuators can have a blow-out opening for blowing out blow-out fluid for enhancing the longitudinal vortices. Where a plurality of second flow actuators are provided, it is further possible in each case to provide both bores and slots or both fixed and movable raised elements.

According to a further embodiment of the method, at least one flow parameter of the fluid flow, in particular the flow speed and/or the flow direction, is measured in a measuring region located upstream, relative to the flow direction, of the one or more first flow actuators. In a further step, a target operating condition for the one or more second flow actuators is determined on the basis of the at least one measured flow parameter. Where the one or more second flow actuators are in the form of active flow actuators, that is to say in the form of movable raised elements or with blow-out openings, the operating conditions of the one or more second flow actuators are set according to the target operating conditions.

One or more measuring points can be provided within the measuring region. The at least one flow parameter can be measured by sensors, for example the flow speed can be measured with pressure sensors, heating wires or the like. In particular, a measured value representing the flow parameter is measured. The determination of the operating conditions on the basis of the measured flow parameter can take place in particular on the basis of a calculation rule or on the basis of an adjusting instruction for an allocation table, according to which a measured value is allocated to a target operating condition. For this purpose there can be provided, for example, a software program installed on a processing unit, which receives as an input value a variable with the measured value and outputs as a variable the target operating condition associated with the measured value from the allocation table.

The operating condition can include in particular a blow-out condition for blowing out the blow-out fluid, in particular one or more of the following conditions: a flow direction of the blow-out fluid, a pulse rate with which the blow-out fluid is blown out in a temporally pulsed manner, a mass flow rate of the blow-out fluid. By adjusting one or more of these conditions, the enhancement of the longitudinal vortex is advantageously adapted in a simple and efficient manner. Alternatively or in addition, the operating condition can include a position condition for the raised elements, in particular a height with which the raised element in question protrudes from the flow surface.

According to a further aspect of the disclosure herein, a flow body system is provided. The flow body system can be provided in particular for carrying out a method according to one of the embodiments described above. The features and advantages disclosed in connection with the method accordingly also apply analogously to the flow body system and vice versa.

According to the disclosure herein, the flow body system has a flow body with a flow surface extending in a flow direction or a depth direction. The flow body system further has a flow control arrangement. The flow control arrangement comprises one or more first flow actuators associated with the flow surface, wherein the one or more first flow actuators are configured to generate longitudinal vortices. The flow control arrangement further comprises one or more second flow actuators associated with the flow surface, which second flow actuators are arranged spaced apart from the one or more first flow actuators in the flow direction or depth direction and are configured to enhance the longitudinal vortices which can be generated by the one or more first flow actuators.

By arranging the first and second flow actuators in succession in the flow direction or depth direction, longitudinal vortices which can be generated by the one or more flow actuators can be stabilized or enhanced in a simple and efficient manner. Separation of a flow flowing over the flow surface is accordingly reliably prevented.

There can be provided in particular a plurality of first flow actuators which are arranged to form a first actuator row. The first flow actuators are thereby arranged spaced apart from one another in a transverse direction extending transversely to the flow direction. Furthermore, a plurality of second flow actuators can also be provided, each of which is arranged to form one or more second actuator rows. For example, a first actuator row and in addition one, two, three, four or more second actuator rows can be provided. The at least one second actuator row is arranged spaced apart from the first actuator row in the flow direction. Within the second actuator row, the second flow actuators are spaced apart from one another in the transverse direction. The flow control arrangement accordingly has a flow actuator grid or array. Within the first and second actuator rows, the first and second flow actuators can be arranged in alignment, for example, so that they form a straight row. Alternatively, it can be provided that the first flow actuators and the second flow actuators of the first and second actuator rows are also arranged spaced apart from one another or offset in the flow direction, so that a curve-like arrangement of the first and second actuator rows is obtained. In general, it can be provided that the first and second actuator rows extend along one another, in particular parallel to one another. The first actuator row may extend along a front edge of the flow body.

The first and/or second flow actuators are spaced apart from one another within the first and second actuator rows by a predetermined distance in the transverse direction, for example between 10 mm and 300 mm. In this range of distances, mutual stabilization of the longitudinal vortices is achieved for a large range of marginal flow conditions, such as the flow speed.

In relation to the flow or depth direction, a first flow actuator and a second flow actuator can be arranged in particular at a distance from one another in a range between 10 mm and 500 mm.

According to one embodiment of the flow body system, it is provided that at least one of the one or more first flow actuators is in the form of a raised element protruding from the flow surface. In particular, all of the one or more first flow actuators, for example within the first actuator row, can be in the form of raised elements. The raised elements may be fixed relative to the flow surface, that is to say they protrude therefrom with a fixed height. A passive first flow actuator is thereby formed.

A structurally simple solution for reliably generating the longitudinal vortices is accordingly provided. In particular, no moving parts are required for producing the flow actuators, which is advantageous in particular with regard to maintenance and operating reliability.

The raised elements can further be designed to be adjustable or movable relative to the flow surface, whereby a height with which the raised element protrudes from the flow surface is adjustable. In particular, purely binary adjustability can be provided, where the raised elements are movable between a working position, in which they protrude from the flow surface, and a retracted position, in which the raised elements are flush with the flow surface. Such binary adjustability can be realised with a fold-out mechanism, for example, in which the raised elements can be folded out from the flow surface, that is to say can be pivoted therefrom, by a positioning device, such as, for example, a spring.

Consequently, a particular raised element can generally be designed to be movable out of and into the flow surface. The height with which the raised element protrudes from the flow surface can accordingly be adjusted. Such a form has the advantage that the generation of longitudinal vortices can be activated or deactivated, or the properties of the longitudinal vortex that is generated are flexibly adjustable and can in particular be adapted to the marginal flow conditions. The raised element can accordingly form an active flow actuator or, as described above, a passive flow actuator. Furthermore, the level of flow drag brought about by the raised elements can in this manner be locally changed.

In order to form a raised element on the flow surface, the first flow actuator can also form a region of the flow surface that can be changed in its geometry, in particular a reversibly deformable region of the flow surface.

In general, it can be provided that the raised elements have a flow-deflecting surface which protrudes from the flow surface and extends obliquely or transversely to the flow direction as well as obliquely to the transverse direction. Flow plates, for example, are suitable as raised elements for this purpose. It can also be provided that the raised elements have a ramp-like, block-like or similar form.

According to a further embodiment of the flow body system, at least one of the one or more first flow actuators forms a blow-out opening at the flow surface for blowing out blow-out fluid. This has the advantage that the properties of the longitudinal vortex that can be generated by the one or more first flow actuators are adjustable, in particular can be adapted to the flow parameters of the fluid flow. There can thus be provided, for example, a first actuator row within which both first flow actuators in the form of raised elements and first flow actuators with blow-out openings are provided. In particular, it can also be provided that all the first flow actuators of the first actuator row have blow-out openings.

A first flow actuator can in particular be in the form of a fluidic oscillator. A flow actuator thereby forms at least one blow-out opening at the flow surface. A channel system is connected thereto, which channel system is designed to generate a self-excited oscillation in the flow of blow-out fluid. It is thus possible to achieve pulsed blowing out and accordingly efficient excitation of longitudinal vortices without moving parts, that is to say with a low maintenance outlay and with high reliability. At the same time, as a result of the blow-out openings, no parasitic flow drag at the flow surface is generated.

It can further be provided that the blow-out opening in the case of at least one of the one or more first flow actuators is formed by a slot extending obliquely to the flow direction. The blow-out opening is here in the form of an elongate slot, for example with a rectangular form. The slot has a longitudinal extent which extends obliquely or at an angle to the flow direction or depth direction. With such a configuration, a shear layer between the blow-out fluid and the fluid flow flowing around the flow surface can be generated in an effective manner, which leads to the formation of longitudinal vortices.

Alternatively or in addition it can be provided that, in the case of at least one of the one or more first flow actuators, the blow-out opening is in the form of a bore, the longitudinal axis of which has a directional component perpendicular to the flow direction or depth direction. Accordingly, the blow-out opening is circular. The blow-out opening forms the end of the bore formed in the flow body. The bore has a longitudinal axis which runs obliquely to a normal direction. The normal direction is perpendicular to a tangent to the flow surface in the region of the blow-out opening and thus runs transversely to the flow direction or depth direction and transversely to the transverse direction. The longitudinal axis of the bore further runs obliquely or transversely to the flow direction. In other words, the longitudinal axis is rotated about an axis running in the transverse direction and about an axis running in the flow direction. The blow-out fluid can thus be blown out in a blow-out direction defined by the longitudinal axis, which has a directional component perpendicular to the flow direction of the fluid flow. The directional component of the blow-out fluid that is perpendicular to the flow direction of the fluid flow efficiently effects turning of the fluid flow and thus advantageously effects the formation of longitudinal vortices.

In general, therefore, a single first flow actuator can be provided, or a plurality of first flow actuators can be provided. In both cases, the first flow actuator can be in the form of a movable or fixed raised element protruding from the flow surface, or the first flow actuator can have a blow-out opening for blowing out blow-out fluid for generating the longitudinal vortices. Where a plurality of first flow actuators are provided, they can all be in the form of movable or fixed raised elements protruding from the flow surface, or all the first flow actuators can have a blow-out opening for blowing out blow-out fluid for generating the longitudinal vortices. Alternatively, some of the first flow actuators can be in the form of movable or fixed raised elements protruding from the flow surface, and some of the first flow actuators can have a blow-out opening for blowing out blow-out fluid for generating the longitudinal vortices. Where a plurality of first flow actuators are provided, it is further possible to provide in each case both bores and slots or both fixed and movable raised elements.

According to a further embodiment, at least one of the one or more second flow actuators for enhancing the longitudinal vortices is in the form of a raised element protruding from the flow surface. In particular, this can be achieved in the same or a similar manner as described with reference to the one or more first flow actuators, so that there will be no repetition at this point.

According to a further embodiment, it is provided that at least one of the second flow actuators forms a blow-out opening of the flow surface for blowing out a blow-out fluid for enhancing the longitudinal vortices which can be generated by the flow actuators of the first actuator row. This therefore creates the possibility of blowing a blow-out or pressurized fluid out of blow-out openings of the flow surface downstream of the one or more first flow actuators. An additional energy input into the flow and in particular into the longitudinal vortex is thereby produced. The longitudinal vortex is thereby enhanced or intensified. This can include in particular increasing the vorticity and/or a reducing the cross-sectional area thereof.

As described above, both the first and the second flow actuators can be in the form of active flow actuators having a blow-out opening. A fluid feed device for blowing fluid out of openings of the flow surface can hereby be provided in particular, both flow actuators with and without net mass flow rates being included.

According to an advantageous development of the flow body system, the blow-out opening in at least one of the second flow actuators is in the form of a slot or bore. In particular, the blow-out opening of the particular second flow actuator can be formed in the same or a similar manner as the blow-out openings of the first actuator row described with reference to the preceding embodiments, so that there will be no repetition at this point.

In general, a single second flow actuator can be provided, or a plurality of second flow actuators can be provided. In both cases, the second flow actuator can be in the form of a movable or fixed raised element protruding from the flow surface, or the second flow actuator can have a blow-out opening for blowing out blow-out fluid. Where a plurality of second flow actuators are provided, they can all be in the form of movable or fixed raised elements protruding from the flow surface, or all the second flow actuators can have a blow-out opening for blowing out blow-out fluid for enhancing the longitudinal vortices. Alternatively, some of the second flow actuators can be in the form of movable or fixed raised elements protruding from the flow surface, and some of the second flow actuators can have a blow-out opening for blowing out blow-out fluid for enhancing the longitudinal vortices. Where a plurality of second flow actuators are provided, there can further be provided in each case both bores and slots or both fixed and movable raised elements, in particular also in a mixture within a particular second actuator row.

According to a further aspect of the present disclosure, an aircraft having a flow body system according to one of the preceding embodiments is provided.

In particular, it can be provided that the flow body of the flow body system forms an aerodynamic guiding member, such as a rudder unit or horizontal tail plane, or an aerodynamic lifting member, such as a wing, of the aircraft or is provided on an aerodynamic guiding or lifting member of the aircraft. The flow body can also be formed by an outer skin of the aircraft.

In general, the flow body system according to the disclosure herein can be used wherever separation of a fluid flow flowing over a flow surface is to be prevented. There come into consideration in particular applications on outer surfaces of vehicles, for example of land, air, space or water craft. The flow body system can also be used in hydraulic pipe systems, such as in air conditioning systems or in energy generating systems.

Consequently, the flow body of the flow body system can also be formed by a body through which a fluid flows, such as, for example, a pipe, an elbow joint or the like. In an aircraft, an engine intake or a transition region from a combustion chamber to a turbine can in particular be provided as the flow body of the flow body system. Pipes of air conditioning systems as flow bodies can also be equipped with the flow control arrangement of the above-described flow body system. In the case of bodies through which a fluid flows, separation is prevented in an efficient and reliable manner by the flow control arrangement, so that a pressure loss in the flow is reduced. In particular when the first and/or second flow actuators are in the form of active flow actuators, the flow body system according to the disclosure herein has the advantage of being adaptable in the case of changing inflow or through-flow conditions, which is particularly advantageous in the case of engines or pipes of air conditioning systems, each of which is operated with changing flow conditions.

The expression "flow actuator" is generally understood herein as being a physical structure or a device which is adapted to introduce a disturbance in the form of a vortex into a fluid flow flowing along a flow surface at a predetermined location of the flow surface. A flow actuator can in particular be formed by a physical structure protruding from the flow surface itself, or by a device which forms a physical structure of the flow surface, such as, for example, an opening thereof, and which is in the form of a device for generating a pressurized fluid flow out of the physical structure.

With regard to directions and axes, in particular directions and axes relating to the arrangement of physical structures, an arrangement of an axis, a direction or a structure "along" another axis, direction or structure is here understood as meaning that the axis, direction or structure, in particular the tangents formed at a respective point of the structures, each extend at an angle of less than 45 degrees, for example less than 30 degrees and for example parallel to one another.

With regard to directions and axes, in particular directions and axes relating to the arrangement of physical structures, an arrangement of an axis, a direction or a structure "transversely" to another axis, direction or structure is here understood as meaning that the axis, direction or structure, in particular the tangents formed at a respective point of the structures, each extend at an angle of greater than or equal to 45 degrees, for example greater than or equal to 60 degrees and for example perpendicularly to one another.

In relation to a flow direction of a fluid flow, this is regarded herein as being in particular the direction of an undisturbed flow outside a boundary layer which forms at a flow surface, over or along which the fluid flow flows.

A fluid flow is herein understood as being flows of both compressible and incompressible fluids, which can in each case be in a gaseous or liquid state of aggregation. Furthermore, a fluid flow within the context of the present disclosure can also be in the form of a flow with both liquid and gaseous volume components. In particular, flows of ambient air, combustion gas mixtures from gas turbines, water and water vapour, coolant of air conditioning systems, such as, for example, R134a, R744, R1234yf, are fluid flows within the context of the present disclosure.

BRIEF DESCRIPTION OF THE DRAWINGS

The disclosure herein is explained in the following with reference to the example drawings, in which.

In the drawings, unless indicated otherwise, the same reference numerals denote components which are the same or have the same function.

DETAILED DESCRIPTION

Figure 1:
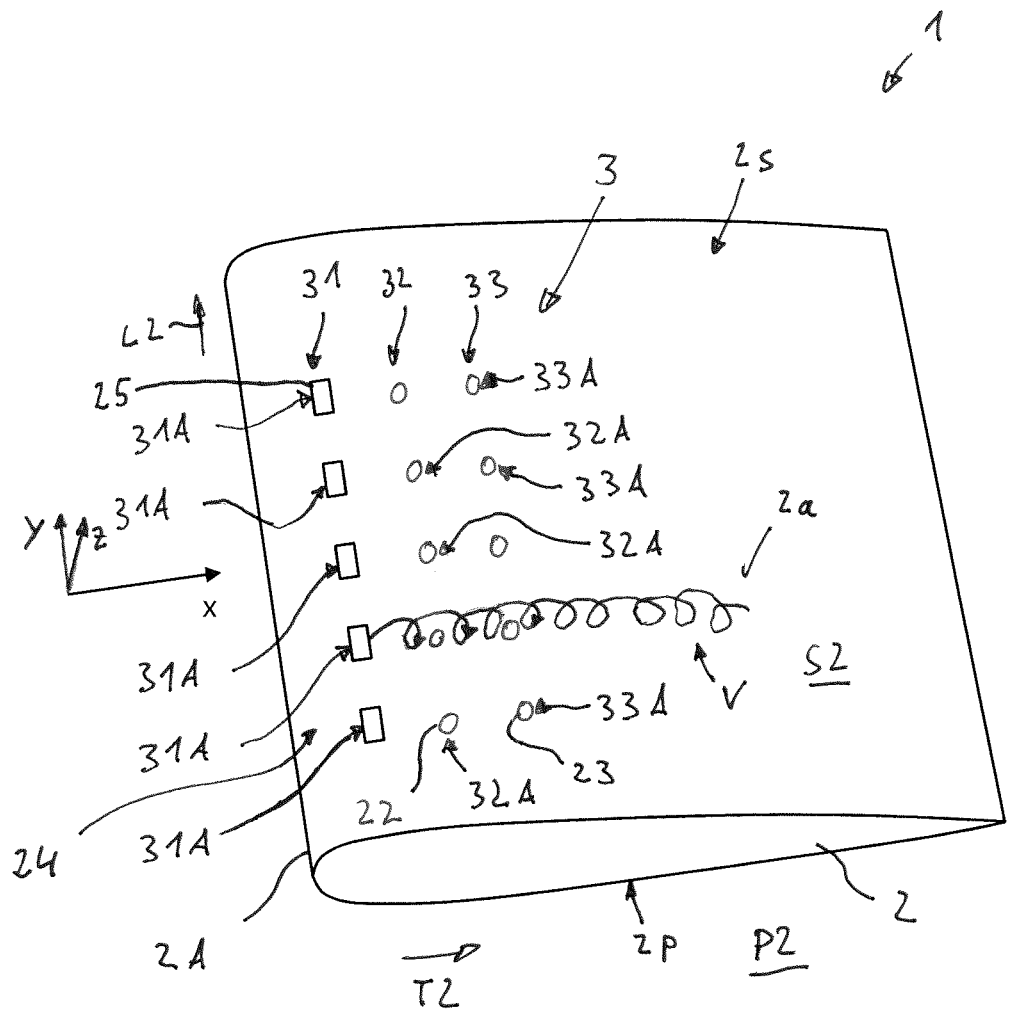
FIG. 1 is a schematic perspective view of a flow body system according to an embodiment of the present disclosure.

FIG. 1 is a schematic view of an example of a flow body system 1 according to the present disclosure. The flow body system 1 has a flow body 2 and a flow control arrangement 3.

As is shown in FIG. 1, the flow body 2 has a flow surface 2a over which an ambient fluid is to flow in a flow direction x.

As is further shown in FIG. 1, the flow body 2 can in particular have a front edge 2A which extends in a flow body longitudinal direction L2 and which forms a front end of the flow body 2, relative to a flow direction x of the ambient fluid. The flow surface 2a can in particular have a first surface region 2s, which defines a suction side S2 of the flow body 2, and a second surface region 2p defining a pressure side P2 of the flow body 2. The flow surface 2a extends in a planar manner in a flow body depth direction T2 running transversely to the flow body longitudinal direction L2, the flow body 2 being provided to be flowed over with a flow direction x along the flow body depth direction T2.

As is shown schematically and by way of example in FIG. 1, the flow control arrangement 3 can in particular have a first actuator row 31 and at least one second actuator row 32, 33. In FIG. 1, two second actuator rows 32, 33 are shown by way of example. In the following, reference is therefore made to this example configuration. It is of course also possible to provide only one or more than two second actuator rows 32, 33. In the flow body system 1 shown by way of example in FIG. 1, the flow control arrangement 3 is provided on the first surface region 2s of the flow surface 2a defining the suction side S2.

As is shown by way of example in FIG. 1, the first actuator row 31 has a plurality of first flow actuators 31A associated with the flow surface 2a, the first flow actuators 31A of the first actuator row 31 being adapted to generate longitudinal vortices V. In FIG. 1, the first flow actuators 31A of the first actuator row 31 are shown merely symbolically as rectangles. The structural form of the first flow actuators 31A will be described in detail in the following with reference to FIGS. 2 through 5. In FIG. 1 there is further shown schematically a longitudinal vortex V which can be generated by a first flow actuator 31A. As is shown in FIG. 1, the first flow actuators 31A of the first actuator row 31 are arranged to form a row. Within that row, the first flow actuators 31A are arranged spaced apart from one another along a transverse direction y extending transversely to the flow direction x. In the flow body system 1 shown by way of example in FIG. 1, the first actuator row 31 extends along the front edge 2A of the flow body 2. The first flow actuators 31A of the first actuator row 31 are thus further arranged spaced apart from one another along the flow body longitudinal direction L2.

As is further shown in FIG. 1, the second actuator rows 32, 33 likewise each have a plurality of second flow actuators 32A, 33A associated with the flow surface 2a. As is shown by way of example in FIG. 1, the second flow actuators 32A, 33A of the second actuator rows 32, 33 are in each case arranged to form a row. Within the row, the flow actuators 32A, 33A are arranged spaced apart from one another along the transverse direction y. In the flow body system 1 shown by way of example in FIG. 1, the second actuator rows 32, 33 each extend along the first actuator row 31. The flow actuators 32A, 33A of the second actuator rows 32, 33 are thus further arranged spaced apart from one another along the flow body longitudinal direction L2. The second actuator rows 32, 33 are each arranged spaced apart from the first actuator row 31 in the flow direction x or in the flow body depth direction T2. In FIG. 1, the second flow actuators 32A, 33A of the second actuator row 32, 33 are shown merely symbolically as circles.

Instead of a first actuator row 31 and at least one second actuator row 32, 33, it is also possible to provide only a first flow actuator 31A and one or more further second flow actuators 32A, 33A spaced apart therefrom in the flow direction x. Furthermore, it can be provided that the actuator rows that are optionally present extend in a generally curved manner.

The second flow actuators 32A, 33A may each form blow-out openings 22, 23 of the flow surface 2a for blowing out a blow-out fluid. The blow-out openings 22, 23 formed by the second flow actuators 32A, 33A can in particular be formed by slots or bores.

If a fluid flow flows in the flow direction x around the flow body 2 shown by way of example in FIG. 1 on the flow surface 2a thereof, longitudinal vortices V are generated by the first flow actuators 31A of the first actuator row 31. In FIG. 1, only a single flow vortex V is shown schematically for reasons of clarity. By the longitudinal vortex V, energy from the external flow is introduced into the boundary layer of the fluid flow, which prevents separation of the fluid flow from the flow surface 2a. The blow-out openings 22, 23 formed by the second flow actuators 32A, 33A of the second actuator rows 32, 33 are so designed that a blow-out or pressurized fluid which can be blown out thereby increases the vorticity of the longitudinal vortex in the region of the blow-out openings. This can be achieved in particular by the blow-out openings 22, 23 of the second actuator rows 32, 33 each defining a flow direction of the blow-out fluid approximately tangentially to the rotational direction of the longitudinal vortices, that is to say extending, for example, with a directional component along the transverse direction y. By the blowing out of the pressurized fluid from the blow-out openings 22, 23 of the second actuator rows 32, 33, the vorticity of the longitudinal vortices generated by the flow actuators 31A of the first actuator row 31 is increased, and the longitudinal vortices are accordingly enhanced or intensified. In this manner, separation of the fluid flow is prevented effectively and efficiently over a large region of the flow surface 2a along the flow direction.

Figure 2:
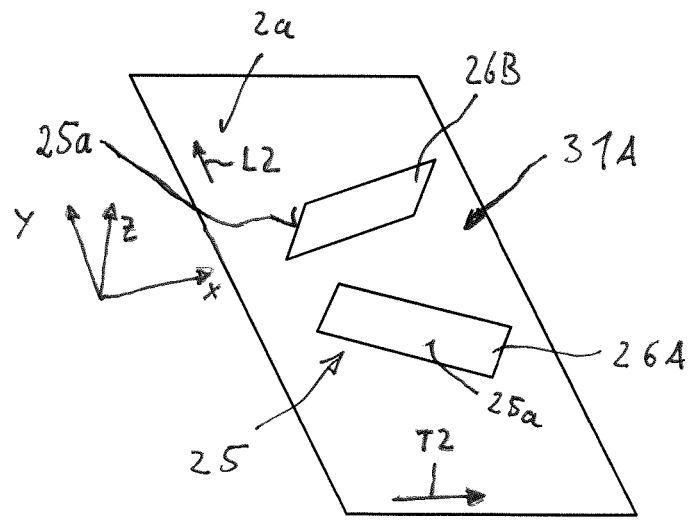
FIG. 2 is a schematic perspective view of a flow actuator of the flow body system according to an embodiment of the present disclosure.
Figure 3:
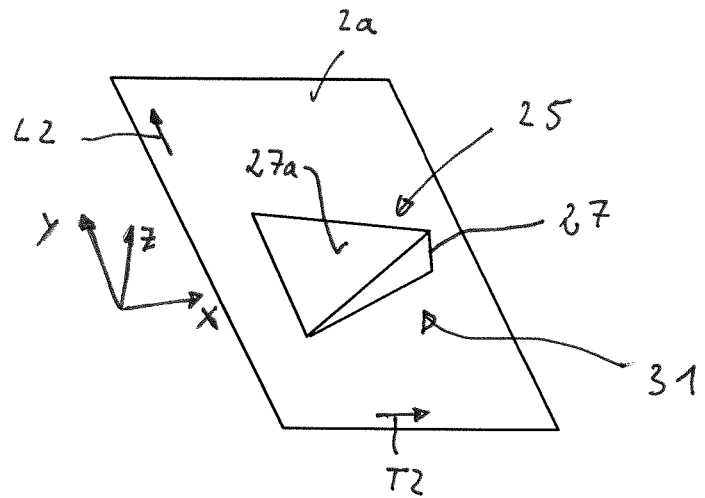
FIG. 3 is a schematic perspective view of a flow actuator of the flow body system according to a further embodiment of the present disclosure.

FIGS. 2 and 3 each show, by way of example, possible configurations of the first flow actuators 31A. In both cases, the flow actuators 31A are in the form of raised elements 25 protruding from the flow surface 2a. In FIG. 2, a single first flow actuator 31A is shown, in which the raised element 25 is in the form of a pair of flow plates 26A, 26B. The raised element 25 can of course also be formed by only a single flow plate 26A, 26B. The flow plates 26A, 26B protrude from the flow surface 2a and are spaced apart from one another in the transverse direction y. In FIG. 2 there is additionally shown by way of example a spacing of the flow plates 26A, 26B in the flow body longitudinal direction L2. The flow plates 26A, 26B each have a longitudinal extent which is oriented obliquely to the flow direction x. As is shown in FIG. 2, the flow plates 26A, 26B form flow-deflecting surfaces 25a extending obliquely or transversely to the flow direction x or the flow body depth direction T2 as well as obliquely or transversely to the transverse direction y or the flow body longitudinal direction L2. A fluid flow flowing in the flow direction x is thus locally deflected in the transverse direction y by the raised element 25 in the form of the flow plates 26A, 26B, whereby at least one longitudinal vortex is formed by each flow plate 26A, 26B. In FIG. 2, the flow plates 26A, 26B are arranged at an angle to one another, in particular they form a V-shape along the flow direction x with a distance between the flow plates 26A, 26B that increases in the flow direction x.

FIG. 3 shows a single first flow actuator 31A in which the raised element 25 is in the form of a ramp 27. The ramp 27 shown by way of example in FIG. 3 has a triangular front face 27a, whereby a normal vector (not shown) at the front face 27a has a directional component directed counter to the flow direction x. According to the exemplary representation in FIG. 3, the front face 27a is so oriented that a normal vector (not shown) to the front face 27a has a directional component directed counter to the flow body depth direction T2. As is further shown by way of example in FIG. 3, the front face 27a tapers in the flow direction x or in the flow body depth direction T2. Furthermore, the height of the ramp 27 increases in relation to a normal direction z perpendicular to the flow direction x and perpendicular to the transverse direction y along the flow direction x or the flow body depth direction T2. The normal direction z can be defined in particular by a normal vector (not shown) at the flow surface 2a.

The raised elements 25 shown by way of example in FIGS. 2 and 3 can each be fixed relative to the flow surface 2a. The raised elements 25 each protrude from the flow surface 2a with a constant height, which does not change over time, relative to the normal direction z. Alternatively, it can be provided that the raised elements 25 are designed to be adjustable in terms of their height, in particular their height relative to the flow surface 2a is adjustable. This can be achieved, for example, by a mechanical adjusting mechanism (not shown).

Although the structural configuration of a first flow actuator 31A has been described by way of example above, a second flow actuator 32A, 33A can also be formed in this way.

Figure 4:
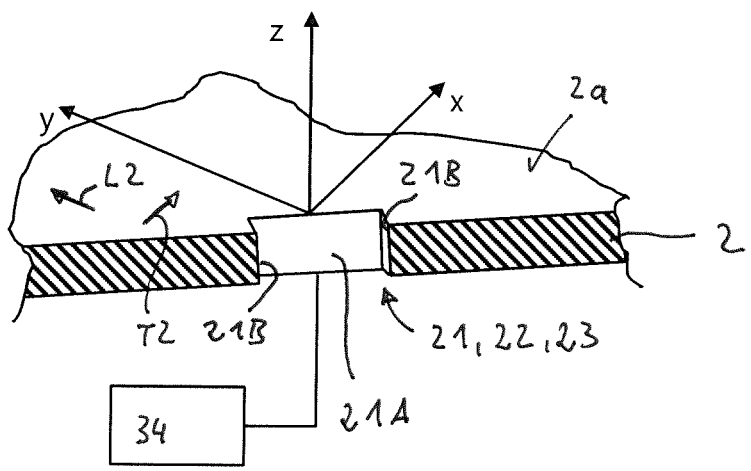
FIG. 4 is a schematic perspective view of a flow actuator of the flow body system according to a further embodiment of the present disclosure.
Figure 5:
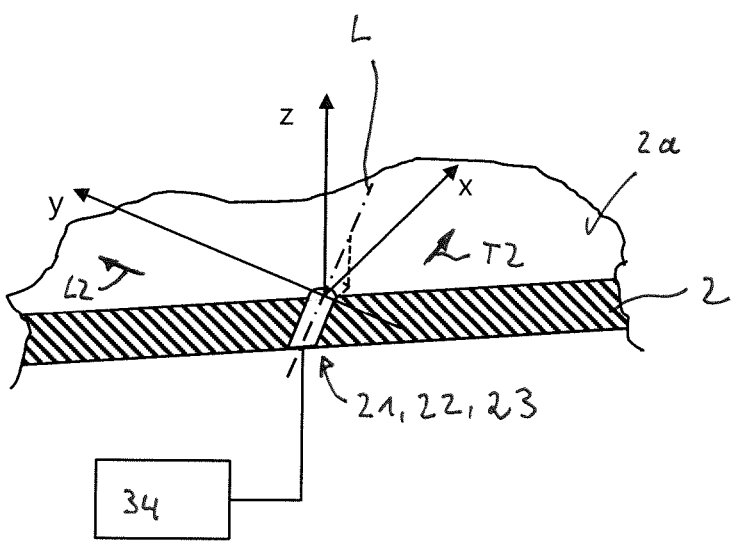
FIG. 5 is a schematic perspective view of a flow actuator of the flow body system according to a further embodiment of the present disclosure.

FIGS. 4 and 5 show by way of example further possible configurations of a first flow actuator 31A. In FIGS. 4 and 5, the fist flow actuator 31A in each case forms a blow-out opening 21 at the flow surface 2a for blowing out blow-out fluid. A blow-out opening 22, 23 formed by a respective second flow actuator 32A, 33A can be designed in the same manner as the blow-out openings 21 formed by a respective first flow actuator 31A. The following observations thus also apply analogously to the one or more second flow actuators 32A, 33A.

As is shown in FIGS. 4 and 5, the blow-out fluid is fed to the blow-out openings 21, 22, 23 by one or more fluid feed devices 34. The fluid feed device 34 forms, from a functional point of view, a pressurized fluid source and can be formed, for example, by a pump. When the flow body system 1 is used in an aircraft, the fluid feed device 34 can be produced, for example, by a connection to a bleed air part of an engine. The bleed air part thus forms the pressurized fluid source. In FIGS. 4 and 5, the fluid feed device 34 is shown only symbolically. The fluid feed device 34 can in particular be configured to blow out blow-out fluid continuously or in a temporally pulsed manner. Blowing out in a temporally pulsed manner can be provided in particular for blowing pressurized fluid out of the blow-out openings 22, 23 of the second flow actuators 32A, 33A for enhancing the longitudinal vortices.

FIG. 4 shows by way of example a configuration of the blow-out openings 21 of a first flow actuator 31A in the form of an elongate slot. The slot has mutually opposite longitudinal side walls 21A which define the longitudinal extent of the slot. The slot further has transverse side walls 21B which connect the longitudinal side walls 21A. The side walls 21A, 21B define a rectangular form of the slot. The slot extends obliquely to the flow direction x. In particular, the longitudinal side walls 21A extend obliquely to the flow direction x. In FIG. 4, it is shown by way of example that the slot extends obliquely to the flow body depth direction T2. The side walls 21A, 21B of the slot can in particular be connected perpendicularly to the flow surface 2a, as is shown by way of example in FIG. 4. A blow-out direction of the blow-out fluid in the normal direction z defined by the side walls 21A, 21B of the slot is thereby achieved. Owing to the longitudinal extent of the slot obliquely to the flow direction x, a shear layer is generated when blow-out fluid is blown out, which shear layer leads to the formation of a longitudinal vortex when a fluid flow flows over the flow surface 2a.

FIG. 5 shows by way of example a configuration of the blow-out openings 21 of a first flow actuator 31A as a bore. The blow-out opening 21 hereby forms an end of a bore formed in the flow body 2 and can in particular be circular, as shown in FIG. 5. The bore has a longitudinal axis L which runs obliquely to the normal direction z. The longitudinal axis L of the bore in particular has a directional component in the transverse direction y. In FIG. 4 it is shown by way of example that the longitudinal axis L of the bore has a directional component along the flow body longitudinal direction L2. The longitudinal axis L thus has a directional component perpendicular to the flow direction x. In this manner, blow-out fluid is blown out of the blow-out opening 21 with a blow-out direction perpendicular to the flow direction x, or a directional component directed along the transverse direction. This effects the formation of a longitudinal vortex when a fluid flow flows over the flow surface 2a. If a blow-out opening 22, 23 of a second flow actuator 32A, 33A is in the form of a bore, as shown by way of example in FIG. 5, it is possible, owing to the extent of the longitudinal axis L of the bore with a directional component along the transverse direction y, for a blow-out fluid to be blown out approximately tangentially to the rotational direction of the longitudinal vortex V which can be generated by the flow actuators 31A of the first flow actuator 31A. In this manner, further energy is fed by the pressurized fluid to the longitudinal vortex V for rotation in the rotational direction by the blow-out fluid, and the longitudinal vortex is thus enhanced.

In the flow body system 1 shown by way of example in FIG. 1, it is provided that the first flow actuators 31A of the first actuator row 31 are all in the form of raised elements 25, in particular raised elements 25 that are fixed relative to the flow surface 2a, and the second flow actuators 32A, 33A of the second actuator row 32, 33 are all in the form of blow-out openings 22, 23. Alternatively, it is also possible to provide in one or more of the actuator rows 31, 32, 33 both flow actuators 31A, 32A, 33A in the form of blow-out openings 21, 22, 23 and flow actuators 31A, 32A, 33A in the form of raised elements 25-fixed or adjustable relative to the flow surface 2a.

Figure 6:
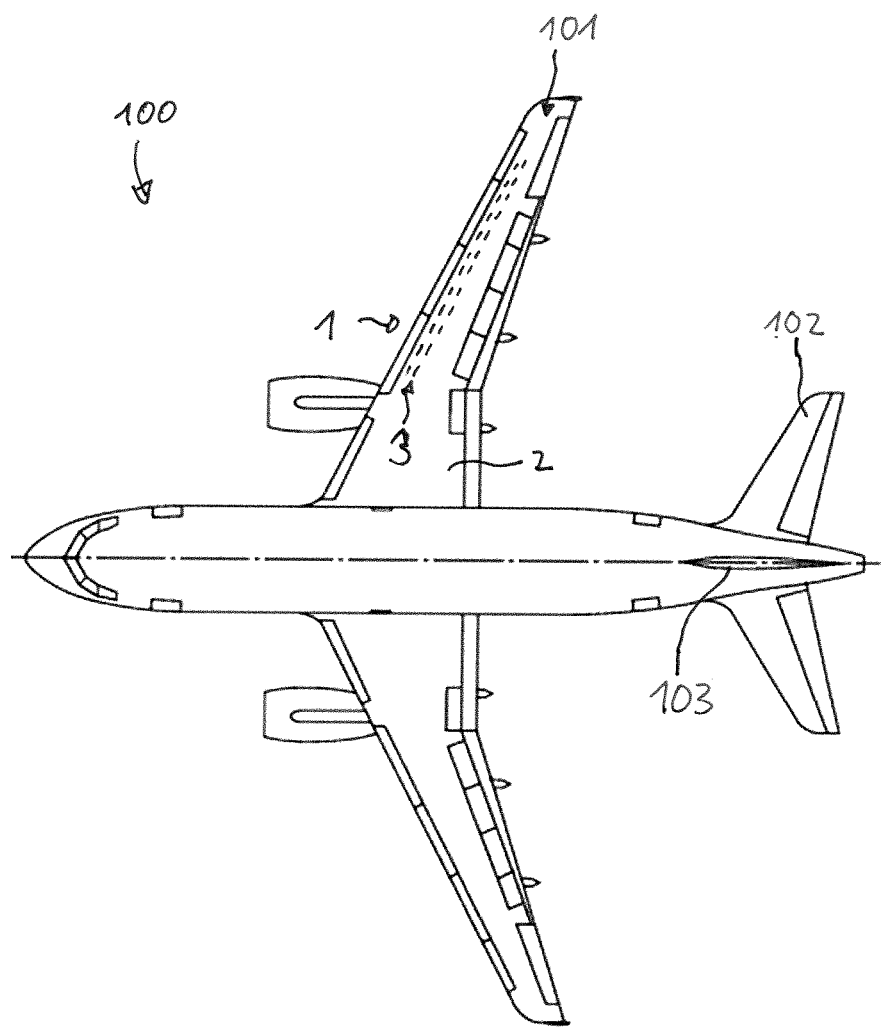
FIG. 6 schematically shows an aircraft having a flow body system according to an embodiment of the present disclosure.

FIG. 6 shows by way of example an aircraft 100 having a flow body system 1. The flow body system 1 is configured in one of the ways described hereinbefore. The flow body system 1 can in particular be provided on a wing 101, a horizontal tail plane 102 and/or on a rudder unit 103, for example as shown in FIG. 6. The wing 101, the horizontal tail plane 102 or the rudder unit 103 and/or in each case a component thereof in each case form a flow body 2 of the flow body system 1, on which the flow control arrangement 3 is provided.

Figure 7:
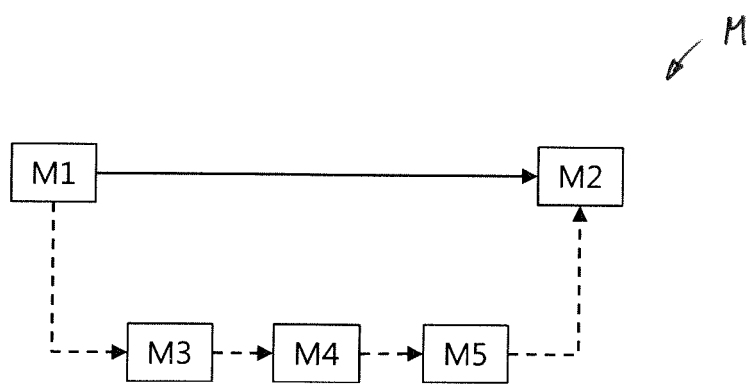
FIG. 7 is a flow diagram of a method according to an embodiment of the present disclosure.

FIG. 7 shows schematically a flow diagram of a method M of preventing separation of a fluid flow. The method is described in the following with reference to the flow body system 1 described hereinbefore.

In a first method step M1, longitudinal vortices are generated for preventing separation of the flow from the flow surface 2a. The longitudinal vortices are generated by the first flow actuators 31A of the first actuator row 31, for example by the raised elements 25 or by blowing blow-out fluid out of the blow-out openings 21 formed by the first flow actuators 31A of the first actuator row 31.

In a further method step M2, the longitudinal vortices are enhanced or intensified by the second flow actuators 32A, 33A, for example by blowing blow-out fluid out of the blow-out openings 22, 23 of the second flow actuators 32A, 33A formed in the flow surface 2a. The above-described increase in the vorticity of the longitudinal vortex by blowing the blow-out fluid out of the blow-out openings 22, 23 of the at least one second actuator row 32, 33 thus leads to stabilization of the longitudinal vortex, so that it supplies energy to the boundary layer over a large region of the flow surface 2a and thereby prevents separation of the fluid flow.

As is shown in FIG. 7, further method steps M3 to M5 can optionally be carried out. Accordingly, measurement M3 of at least one flow parameter of the fluid flow is optionally carried out in a measuring region 24 located upstream, relative to the flow direction x, of the first flow actuators 31A. The measuring region 24 is shown schematically in FIG. 1. For example, the measuring region 24 can be defined as a region of the flow surface 2a which optionally extends along the first actuator row 31. The measuring region 24 can also be formed by the front edge 2A. Measurement M3 takes place by sensors (not shown), for example pressure sensors for determining the flow speed.

Furthermore, determination M4 of a target operating condition for the second flow actuators 32A, 33A on the basis of the at least one measured flow parameter is carried out. If the second flow actuators 32A, 33A, as shown by way of example in FIG. 1, are formed with blow-out openings 22, 23, the operating condition can include, for example, determining a pulse rate for blowing out the blow-out fluid. If the second flow actuators 32A, 33A are formed by movable raised elements 25 (not shown), the operating condition can include, for example, determining a height with which the raised elements protrude from the flow surface 2a in the normal direction z. In both cases, a control device (not shown), for example in the form of a digital control device with a processor and a memory, can be provided. The processor is configured to receive signals generated by the sensors. The processor is further configured to execute a software program stored in the memory, which software program receives values corresponding to the strength of the signals as input values and outputs, as the output value, values on the basis of which the processor generates output signals. The output values relate to setting parameters for setting the target operating conditions.

Setting M5 of the operating conditions of the second flow actuators 32A, 33A according to the target operating conditions is further carried out. Setting is effected, for example, by generating output signals by the control device, the output signals causing actuation of a setting device, for example in the form of the fluid feed device 34 or a movement mechanism (not shown) for retracting and deploying the raised elements 25.

Although the present disclosure has been explained by way of example above with reference to embodiments, it is not limited thereto but can be modified in many different ways. Combinations of the preceding embodiments are conceivable in particular.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of preventing separation of a fluid flow flowing in a flow direction over a flow surface, comprising:
    generating longitudinal vortices for preventing separation of the flow from the flow surface by one or more first flow actuators associated with the flow surface; and
    enhancing the longitudinal vortices by one or more second flow actuators associated with the flow surface, wherein each of the one or more second flow actuators is arranged downstream of a respective one of the first flow actuators in the flow direction.

2. The method of claim 1, wherein for generating the longitudinal vortices there is provided a first actuator row having a plurality of first flow actuators and for enhancing the longitudinal vortices there is provided at least one second actuator row having a plurality of second flow actuators.

3. The method of claim 1, wherein at least one of the one or more first flow actuators for generating the longitudinal vortices is in a form of a raised element protruding from the flow surface.

4. The method of claim 1, wherein the longitudinal vortices are generated by blowing a blow-out fluid out of a respective first blow-out opening, formed in the flow surface, of the one or more first flow actuators.

5. The method of claim 4, wherein the blow-out opening of at least one of the one or more first flow actuators is formed by a slot extending obliquely to the flow direction.

6. The method of claim 4, wherein the blow-out opening of at least one of the one or more first flow actuators is formed by a bore through which the blow-out fluid is blown out with a directional component perpendicular to the flow direction of the fluid flow.

7. The method of claim 1, wherein at least one of the one or more second flow actuators for enhancing the longitudinal vortices is in a form of a raised element protruding from the flow surface.

8. The method of claim 1, wherein the longitudinal vortices are enhanced by blowing blow-out fluid out of a respective blow-out opening, formed in the flow surface, of one or more of the second flow actuators.

9. The method of claim 8, wherein the blow-out opening of at least one of the one or more second flow actuators is in a form of a slot or bore.

10. The method of claim 1, further comprising:
measuring at least one flow parameter of the fluid flow in a measuring region located upstream, relative to the flow direction, of the one or more first flow actuators;
determining a target operating condition for the one or more second flow actuators on a basis of the at least one measured flow parameter; and
setting one or more operating condition of the one or more second flow actuators according to the target operating condition.

11. The method of claim 10, wherein the operating condition includes a blow-out condition for the blowing out of the blow-out fluid.

12. The method of claim 11, wherein the operating condition includes at least one of a flow direction of the blow-out fluid, a pulse rate with which the blow-out fluid is blown out in a temporally pulsed manner, and a mass flow rate of the blow-out fluid.

13. The method of claim 10, wherein the operating condition includes a height with which a raised element protrudes from the flow surface.

14. A flow body system having:
a flow body having a flow surface extending in a flow direction; and
a flow control arrangement having one or more first flow actuators associated with the flow surface, which first flow actuators are configured to generate longitudinal vortices, and having one or more second flow actuators associated with the flow surface, wherein each of the one or more second flow actuators is arranged spaced apart from a respective one of the one or more first flow actuators in the flow direction and is configured to enhance the longitudinal vortices generated by the respective one of the one or more first flow actuators.

15. The flow body system of claim 14, comprising a first actuator row having a plurality of first flow actuators and at least one second actuator row having a plurality of second flow actuators.

16. The flow body system of claim 14, wherein at least one of the one or more first flow actuators is in a form of a raised element protruding from the flow surface.

17. The flow body system of claim 14, wherein at least one of the one or more first flow actuators forms a blow-out opening at the flow surface for blowing out blow-out fluid.

18. The flow body system of claim 17, wherein the blow-out opening of at least one of the one or more first flow actuators is formed by a slot extending obliquely to the flow direction.

19. The flow body system of claim 17, wherein the blow-out opening of at least one of the one or more first flow actuators is in a form of a bore, a longitudinal axis of which has a directional component perpendicular to the flow direction.

20. The flow body system of claim 14, wherein at least one of the one or more second flow actuators is in a form of a raised element protruding from the flow surface.

21. The flow body system of claim 14, wherein at least one of the second flow actuators forms a blow-out opening of the flow surface for blowing out a blow-out fluid for enhancing the longitudinal vortices which can be generated by the flow actuators of the first actuator row.

22. The flow body system according to claim 21, wherein the blow-out opening of at least one of the one or more second flow actuators is in a form of a slot or bore.

23. An aircraft having a flow body system, the flow body system comprising:
a flow body having a flow surface extending in a flow direction; and
a flow control arrangement having one or more first flow actuators associated with the flow surface, which first flow actuators are configured to generate longitudinal vortices, and having one or more second flow actuators associated with the flow surface, wherein each of the one or more second flow actuators is arranged spaced apart from a respective one of the one or more first flow actuators in the flow direction and is configured to enhance the longitudinal vortices generated by the respective one of the one or more first flow actuators.

* * * * *